Patented May 20, 1930

1,759,408

UNITED STATES PATENT OFFICE

ALBERT F. KUNBERGER, OF SWARTHMORE, PENNSYLVANIA, ASSIGNOR TO THE UNITED GAS IMPROVEMENT COMPANY, OF PHILADELPHIA, PENNSYLVANIA, A CORPORATION OF PENNSYLVANIA

METHOD FOR PURIFYING GAS FROM HYDROGEN SULPHIDE WITH PRODUCTION OF ZINC SULPHIDE

No Drawing. Application filed March 8, 1928. Serial No. 260,253.

The present invention relates to the purification of gases, as for instance, illuminating gas from hydrogen sulphide and to the production of zinc sulphide which is useful as a pigment.

The principal objects of the invention are to provide a process for the purification of gases from hydrogen sulphide, with the production of a marketable zinc sulphide, as a by-product of the gas purification process.

Generally stated, the process consists of bringing the gases containing hydrogen sulphide into contact with a solution of zinc ammonium chloride in ammonium chloride, preferably passing the solution in counterflow relation to the gas.

The solution of zinc ammonium chloride in ammonium chloride may be prepared by bringing metallic zinc or zinc dross in contact with carbon; as for instance, electrode carbons or with a metal electro negative to zinc in a suitable vessel and submerging them in a solution of ammonium chloride. Galvanic action takes place and the zinc goes into solution as a double salt of zinc and ammonium which is soluble in the ammonium chloride solution. This solution is removed from the metallic zinc and carbon.

Gas containing hydrogen sulphide is brought into contact with this solution and the hydrogen sulphide reacts with the ammoniacal zinc chloride, forming zinc sulphide and ammonium chloride. The zinc sulphide thus produced is in the form of an insoluble precipitate, and is removed from the solution of ammonium chloride by any suitable method, as for instance, filtration.

The ammonium chloride thus formed by the reaction of the hydrogen sulphide with the ammoniacal zinc chloride is returned to the vessel containing the metallic zinc and carbon to again dissolve an additional amount of zinc after which it is again removed from the vessel and brought in contact with the gas containing hydrogen sulphide, and so forth in repetition.

From the above description it will be understood that the operation of this process may be a continuous cycle of dissolving zinc in one container and carrying it in the form of a double salt of zinc ammonium chloride into another vessel, as for instance, a scrubber, to react with the hydrogen sulphide contained in the gas, to be purified and returning the ammonium chloride after removing the zinc sulphide formed by the reaction of the ammonium zinc chloride with the hydrogen sulphide to the vessel containing the zinc and carbon, to again react with the zinc therein.

The process possesses the double advantage of efficiency in purifying the gas from hydrogen sulphide and producing as a by-product zinc sulphide, which is more valuable per pound than the zinc or zinc dross employed in the process.

Instead of zinc or zinc dross, in contact with carbon, galvanized iron, as for instance, in the form of galvanized iron scrap may be used to produce the ammoniacal zinc chloride solution, the iron being electro negative to the zinc coating.

It will be obvious to those skilled in the art to which the invention relates that modifications may be made in details of procedure and the selection of chemical equivalents without departing from the spirit of the invention which is not limited to such matters or otherwise than the prior art and the appended claims may require.

I claim:

1. A process of purifying gases from hydrogen sulphide which comprises effecting a double decomposition of hydrogen sulphide and zinc chloride producing insoluble zinc sulphide and ammonium chloride by washing the gas with a solution of zinc ammonium chloride in ammonium chloride.

2. In the process of purifying gases from hydrogen sulphide by contacting the gas containing hydrogen sulphide with a double salt of zinc and ammonium in an ammonium chloride solution thereby precipitating zinc sulphide and leaving an ammonium chloride solution, the step of revivifying the spent ammonium chloride solution which consists in subjecting it to the galvanic action of zinc and a substance electro negative to zinc.

ALBERT F. KUNBERGER.